(12) United States Patent
Luan et al.

(10) Patent No.: US 8,482,836 B2
(45) Date of Patent: Jul. 9, 2013

(54) FLEXIBLE DISPLAY DEVICE

(75) Inventors: Ta-Nien Luan, Hsinchu (TW); You-Chi Tsai, Hsinchu (TW); Ming-Sheng Chiang, Hsinchu (TW); Chi-Ming Wu, Hsinchu (TW); Hung-Yi Tsai, Hsinchu (TW); Jen-Shiun Huang, Hsinchu (TW); Wen-Chang Lu, Hsinchu (TW); Yuan-Chih Tsai, Hsinchu (TW); Lee-Tyng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 50 days.

(21) Appl. No.: 13/104,181

(22) Filed: May 10, 2011

(65) Prior Publication Data

US 2012/0212797 A1 Aug. 23, 2012

(30) Foreign Application Priority Data

Feb. 21, 2011 (TW) ................................. 100105674

(51) Int. Cl.
*G02F 1/07* (2006.01)
*G02F 1/15* (2006.01)
*G02B 26/00* (2006.01)

(52) U.S. Cl.
USPC ............................ 359/245; 359/296; 359/265

(58) Field of Classification Search
USPC ............. 359/245, 265, 296; 345/107; 430/32; 204/600
See application file for complete search history.

(56) References Cited

U.S. PATENT DOCUMENTS

| 7,554,712 B2 * | 6/2009 | Patry et al. ..................... 359/254 |
| 2009/0034057 A1 * | 2/2009 | LeCain et al. ................ 359/296 |

* cited by examiner

*Primary Examiner* — William Choi
(74) *Attorney, Agent, or Firm* — WPAT, PC; Justin King

(57) ABSTRACT

A flexible display device includes a flexible substrate, a display layer, a first protecting layer, and at least one light-pervious polymer film. The display layer is arranged on the flexible substrate. The first protecting layer is arranged on the display layer. The at least one light-pervious polymer film is arranged on the first protecting layer. The light-pervious polymer film is used to protect the flexible display device from being damaged by external force.

7 Claims, 2 Drawing Sheets

FLEXIBLE DISPLAY DEVICE

FIELD OF THE INVENTION

The present invention relates to a display device, and more particularly to a flexible display device.

BACKGROUND OF THE INVENTION

With the rapid developments of flat panel display (FPD) technology, electronic devices, especially portable electrical products including mobile phones, e-book apparatus, digital cameras, personal digital assistants (PDAs), etc. are generally equipped with display devices. As developing trends of the portable electrical products are becoming lighter and thinner, accordingly, the display devices equipped in the portable electrical products should also be light and thin to meet developing trends of the portable electrical products.

Flexible display devices, such as flexible electrophoretic display ("flexible EPD" for short) and flexible liquid crystal display ("flexible LCD" for short) are not only light and thin, but also flexible and durable. In this regard, manufacturing of the flexible display devices have been an important developing trend.

A conventional flexible display device generally includes a substrate, a display layer arranged on the substrate, and a single protecting layer arranged on the display layer. It is difficult for the protecting layer to provide sufficient cushioning effect for the conventional flexible display device, when the flexible display device is impacted by external force. Components and control circuits on the substrate and the display layer are easy to be damaged. In this regard, in one aspect, the flexible display device may not be operated normally. In another aspect, lifespan of the flexible display device may be shortened.

SUMMARY OF THE INVENTION

The present invention provides a flexible display device having excellent impact resistance and long lifespan.

To achieve the above mentioned advantages, a flexible display device is provided. The flexible display device includes a flexible substrate, a display layer, a first protecting layer and at least one light-pervious polymer film. The display layer is arranged on the flexible substrate. The first protecting layer is arranged on the display layer. The at least one light-pervious polymer film is arranged on the first protecting layer.

In one embodiment of the present invention, material of the light-pervious polymer film is selected from a group consisting optical clear adhesive (OCA), polyethylene terephthalate (PET), and polycarbonate (PC).

In one embodiment of the present invention, the at least one light-pervious polymer film includes a number of the light-pervious polymer films. The light-pervious polymer films are stacked on the first protecting layer in sequence.

In one embodiment of the present invention, the flexible display device further includes a first encapsulation layer. The first encapsulation layer is arranged on the flexible substrate and surrounds the display layer and the first protecting layer.

In one embodiment of the present invention, the flexible display device further includes a second protecting layer. The second protecting layer is arranged on the at least one light-pervious polymer film.

In one embodiment of the present invention, each of the first protecting layer and the second protecting layer is made of material selected from a group consisting of transparent plastic, transparent glass, partially transparent plastic, and partially transparent glass.

In one embodiment of the present invention, the flexible display device further includes a third protecting layer. The third protecting layer is arranged at a side of the flexible substrate facing away from the display layer.

In one embodiment of the present invention, the flexible display device further includes a second encapsulation layer. The second encapsulation layer is arranged on the third protecting layer and surrounds the flexible substrate, the first encapsulation layer, the at least one light-pervious polymer film, and the second protecting layer.

In one embodiment of the present invention, the first protecting layer, the at least one light-pervious polymer film, and the second protecting layer cooperatively cover the display layer. A surface area of the cooperating first protecting layer, the at least one light-pervious polymer film, and the second protecting layer covering the display layer is equal to or greater than a surface area of the display layer.

In one embodiment of the present invention, the display layer is an electronic paper display layer.

The flexible display device of the present invention is equipped with the at least one light-pervious polymer film arranged on the first protecting layer. When the flexible display device is impacted by external force accidentally, the at least light-pervious polymer film serves as cushioning layer to absorb or evenly disperse the external force. In this manner, the at least light-pervious polymer film decreases impact applied on the display layer and the flexible substrate, thus avoiding damage of the display layer and the flexible substrate caused by the external force and extending lifespan of the flexible display device.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
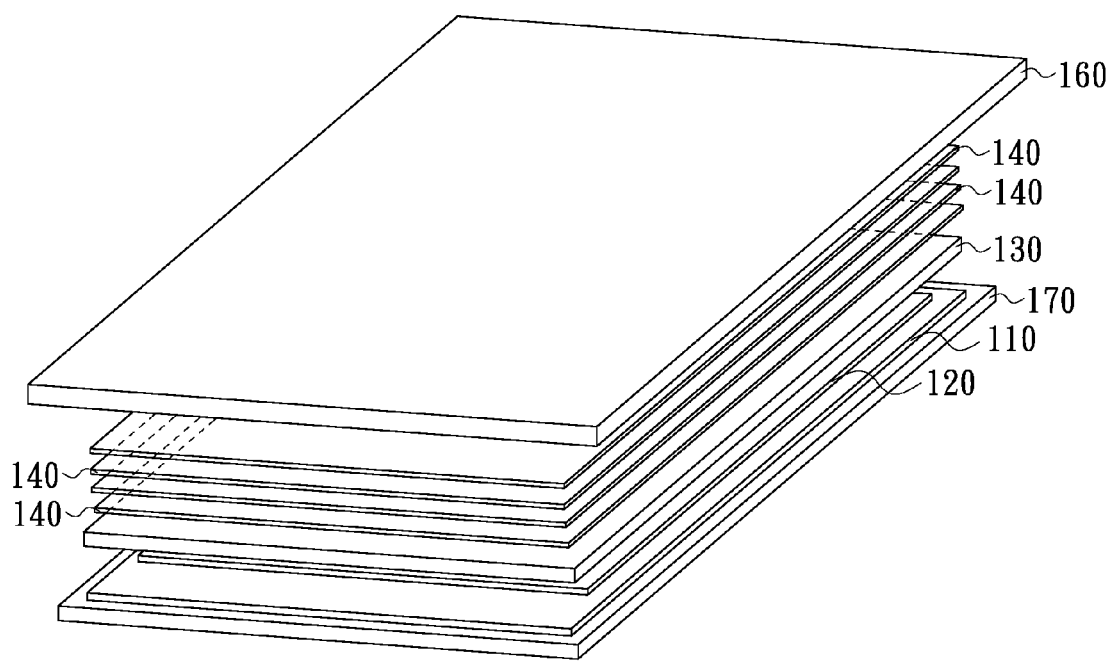
FIG. 1 is a schematic three dimensional and exploded view of a flexible display device, in accordance with an embodiment of the present invention.
Figure 2:
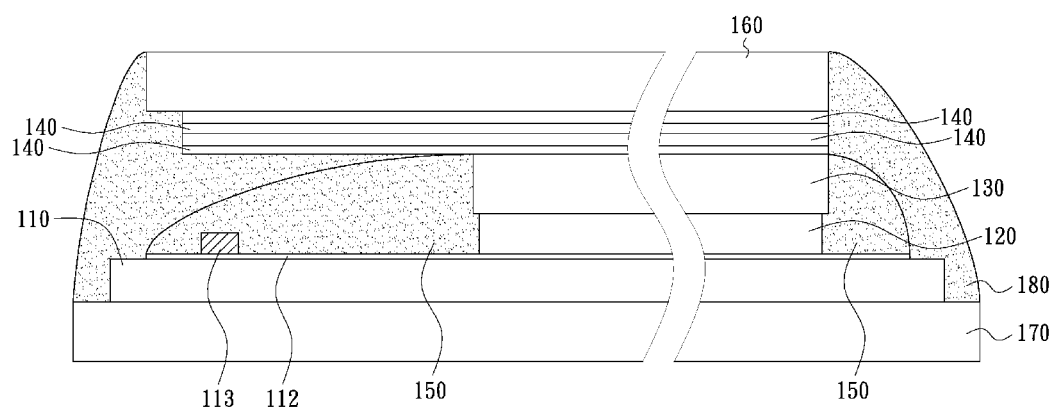
FIG. 2 is a schematic cross section of the flexible display device of FIG. 1.

FIG. 1 is a schematic three dimensional and exploded view of a flexible display device according to an embodiment of the present invention. FIG. 2 is schematic cross section of the flexible display device of FIG. 1. Referring to FIG. 1 and FIG. 2, the flexible display device 100 in this embodiment includes a flexible substrate 110, a display layer 120, a first protecting layer 130, and at least one light-pervious polymer film 140. In this embodiment, the at least one light-pervious polymer film 140 includes a number of the light-pervious polymer films 140. The display layer 120 is arranged on the flexible substrate 110, and the first protecting layer 130 is arranged on the display layer 120. The light-pervious polymer films 140 are arranged on the first protecting layer 130. In this embodiment, the light-pervious polymer films 140 are stacked on the first protecting layer 130 in sequence.

The above mentioned flexible substrate 110 is a substrate having a drive circuit layer 112 (such as a thin film transistor array and a peripheral circuit electrically connected to the thin film transistor array) and a drive component 113 (such as a drive chip). The drive circuit layer 112 and the drive component 113 are not shown in FIG. 1. The display layer 120 can be an electronic paper display layer, such as an electrophoretic display layer, a cholesteric display layer or an electrowetting display layer. It is noted that the display layer 120 may be another suitable display layer, which is not limited to this embodiment. In addition, material of the first protecting layer 130 can be transparent plastic, transparent glass, partially transparent (or semi-opaque) plastic, or partially transparent glass. It is noted the material of the first protecting layer 130 is not limited to this embodiment. Moreover, material of the light-pervious polymer films 140 can be optical clear adhesive (OCA), polyethylene terephthalate (PET), or polycarbonate (PC), etc. Alternatively, the light-pervious polymer films 140 may be another suitable polymer film having high transmittance, high viscosity, high resilience and impact absorption property.

Compared to conventional technologies, the flexible display device 100 of this embodiment is equipped with light-pervious polymer films 140 stacked on the first protecting layer 130. When the flexible display device 100 is impacted by external force, the light-pervious polymer films 140 provide cushioning effect, thus avoiding damage of the display layer 120 and the flexible substrate 110 caused by the external force and extending lifespan of the flexible display device 100. In addition, the number of the light-pervious polymer films 140 and thickness of each light-pervious polymer film 140 can be varied according to actual needs. In the present invention, the number of the light-pervious polymer films 140 and thickness of each light-pervious polymer film 140 are not limited.

In this embodiment, the flexible display device 100 may further include a first encapsulation layer 150 (not shown in FIG. 1). The first encapsulation layer 150 is arranged on the flexible substrate 110, and surrounds the display layer 120 and the first protecting layer 130. In this embodiment, the first encapsulation layer 150 encapsulates the display layer 120 and the first protecting layer 130, and is used to protect the display layer 120 from being damaged by water vapors. In addition, the flexible display device 100 may further include a second protecting layer 160. The second protecting layer 160 is arranged on the light-pervious polymer film 140, and is used to enhance impact resistance of the flexible display device 100. Material of the second protecting layer 160 can be transparent plastic, transparent glass, partially transparent plastic or partially transparent glass. It is noted that the material of the second protecting layer 160 is not limited to this embodiment.

The first protecting layer 130, the light-pervious polymer films 140, and the second protecting layer 160 cooperate to cover the display layer 120. In this embodiment, the first protecting layer 130, the light-pervious polymer films 140, and the second protecting layer 160 fully cover the display layer 120. That is, a surface area of the cooperating first protecting layer 130, light-pervious polymer films 140, and second protecting layer 160 facing the display layer 120 is equal to or greater than a surface area of the display layer 120 facing (or contacting) the first protecting layer 130.

In this embodiment, the flexible display device 100 may further include a third protecting layer 170 and a second encapsulation layer 180. The third protecting layer 170 is arranged under the flexible substrate 110. That is, the third protecting layer 170 is arranged at a side of the flexible substrate 110 facing away from the display layer 120. The second encapsulation layer 180 is arranged on the third protecting layer 170, and surrounds the flexible substrate 110, the first encapsulation layer 150, the at least one light-pervious polymer film 140, and the second protecting layer 160. In this embodiment, the first encapsulation layer 150 and the second encapsulation layer 180 cooperate to encapsulate peripheries of the flexible display device 100, but does not shield light from the display layer 150, thus avoiding limiting field of view (FOV) of the flexible display device 100. With this configuration, the flexible substrate 110 and the display layer 120 are further protected from being damaged by water vapors. In this embodiment, each of the first encapsulation layer 150 and the second encapsulation layer 180 can be made of polymer adhesive, such as thermoplastic adhesive, thermosetting adhesive, ultraviolet curing adhesive, or room temperature curing adhesive. It is noted material of the first encapsulation layer 150 and the second encapsulation layer 180 is not limited to this embodiment.

In summary, the flexible display device of the present invention is equipped with the at least one light-pervious polymer film arranged on the first protecting layer, and the light-pervious polymer film is arranged above the flexible substrate and the display layer. When the flexible display device is impacted by external force accidentally, the at least one light-pervious polymer film serves as cushioning layer to absorb or evenly disperse the external force. In this manner, the at least one light-pervious polymer film decreases impact applied on the display layer and the flexible substrate, thus avoiding damage of the display layer and the flexible substrate caused by the external force and extending lifespan of the flexible display device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flexible display device, comprising:
   a flexible substrate;
   a display layer arranged on the flexible substrate;
   a first protecting layer arranged on the display layer;
   at least one light-pervious polymer film arranged on the first protecting layer;
   a second protecting layer arranged on the at least one light-pervious polymer film; and
   a third protecting layer arranged at a side of the flexible substrate facing away from the display layer, wherein the flexible substrate is located between the third protecting layer and the display layer; and
   a first encapsulation layer, wherein the first encapsulation layer is arranged on the flexible substrate and surrounds the display layer and the first protecting layer.

2. The flexible display device according to claim 1, wherein the light-pervious polymer film is made of material selected from a group consisting of optical clear adhesive, polyethylene terephthalate, and polycarbonate.

3. The flexible display device according to claim 1, wherein the at least one light-pervious polymer film comprises a plurality of the light-pervious polymer films, and the light-pervious polymer films are stacked on the first protecting layer in sequence.

4. The flexible display device according to claim 1, wherein each of the first protecting layer and the second protecting layer is made of material selected from a group consisting of transparent plastic, transparent glass, partially transparent plastic, and partially transparent glass.

5. The flexible display device according to claim 1, further comprising a second encapsulation layer, wherein the second encapsulation layer is arranged on the third protecting layer and surrounds the flexible substrate, the first encapsulation layer, the at least one light-pervious polymer film, and the second protecting layer.

6. The flexible display device according to claim 1, wherein the first protecting layer, the at least one light-pervious polymer film, and the second protecting layer cooperatively cover the display layer, a surface area of the cooperating first protecting layer, light-pervious polymer film, and second protecting layer covering the display layer is equal to or greater than a surface area of the display layer.

7. The flexible display device according to claim 1, wherein the display layer is an electronic paper display layer.

* * * * *